(12) United States Patent
Salapura et al.

(10) Patent No.: US 11,153,223 B2
(45) Date of Patent: Oct. 19, 2021

(54) SPECIFYING A DISAGGREGATED COMPUTE SYSTEM

(71) Applicant: International Business Machines Corporation, Armonk, NY (US)

(72) Inventors: Valentina Salapura, Chappaqua, NY (US); John Alan Bivens, Ossining, NY (US); Koushik K. Das, New York, NY (US); Min Li, San Jose, CA (US); Ruchi Mahindru, Elmsford, NY (US); Harigovind V. Ramasamy, Ossining, NY (US); Yaoping Ruan, White Plains, NY (US); Eugen Schenfeld, South Brunswick, NJ (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 15/093,082

(22) Filed: Apr. 7, 2016

(65) Prior Publication Data

US 2017/0295107 A1 Oct. 12, 2017

(51) Int. Cl.
*H04L 12/911* (2013.01)
*H04L 12/24* (2006.01)
(Continued)

(52) U.S. Cl.
CPC ............ *H04L 47/70* (2013.01); *G06F 9/50* (2013.01); *H04L 41/0896* (2013.01);
(Continued)

(58) Field of Classification Search
None
See application file for complete search history.

(56) References Cited

U.S. PATENT DOCUMENTS 6,823,458 B1 * 11/2004 Lee .................. G06F 21/6236
707/999.009
8,219,752 B1 * 7/2012 Jenkins ............ G06F 12/0815
711/118
(Continued)

FOREIGN PATENT DOCUMENTS

CN 103970587 8/2014
JP H11275551 A * 10/1999
WO WO-2017020235 A1 * 2/2017 ............. H04L 47/52

OTHER PUBLICATIONS

International Search Report, PCT/IB2017/051383, dated Jul. 22, 2017.
(Continued)

*Primary Examiner* — Younes Naji
(74) *Attorney, Agent, or Firm* — Jeffrey S. LaBaw; David H. Judson

(57) ABSTRACT

Server resources in a data center are disaggregated into shared server resource pools. Servers are constructed dynamically, on-demand and based on workload requirements, by allocating from these resource pools. A disaggregated compute system of this type keeps track of resources that are available in the shared server resource pools, and it manages those resources based on that information. Each server entity built is assigned with a unique server ID, and each resource that comprises a component thereof is tagged with the identifier. As a workload is processed by the server entity, its composition may change, e.g. by allocating more resources to the server entity, or by de-allocating resources from the server entity. Workload requests are associated with the unique server ID for the server entity. When a workload request is received at a resource, it matches its unique server ID to that of the request before servicing the request.

20 Claims, 7 Drawing Sheets

(51) Int. Cl.
*G06F 9/50* (2006.01)
*H04L 12/26* (2006.01)

(52) U.S. Cl.
CPC .......... *H04L 41/5025* (2013.01); *H04L 43/06* (2013.01); *H04L 41/5077* (2013.01)

(56) References Cited

U.S. PATENT DOCUMENTS

| | | | |
|---|---|---|---|
| 8,954,698 B2 | 2/2015 | Schenfeld et al. | |
| 10,389,648 B2* | 8/2019 | Cheng | H04L 47/6265 |
| 2003/0014660 A1* | 1/2003 | Verplaetse | G08B 13/1418 |
| | | | 726/35 |
| 2004/0133622 A1* | 7/2004 | Clubb | G06Q 40/02 |
| | | | 709/200 |
| 2004/0230762 A1* | 11/2004 | Allen | G06F 12/0284 |
| | | | 711/170 |
| 2004/0230976 A1* | 11/2004 | Slegel | G06F 9/30087 |
| | | | 718/100 |
| 2008/0028107 A1* | 1/2008 | Cherian | G06F 3/0607 |
| | | | 710/9 |
| 2009/0113124 A1* | 4/2009 | Kataoka | G06F 9/5022 |
| | | | 711/112 |
| 2010/0251248 A1* | 9/2010 | Hosouchi | G06F 9/5033 |
| | | | 718/102 |
| 2012/0124270 A1* | 5/2012 | Weissman | G06F 9/45558 |
| | | | 711/6 |
| 2013/0097304 A1 | 4/2013 | Asthana et al. | |
| 2013/0173804 A1* | 7/2013 | Murthy | G06F 9/5022 |
| | | | 709/226 |
| 2014/0006621 A1 | 1/2014 | Sims | |
| 2015/0012657 A1* | 1/2015 | Botti | H04W 4/029 |
| | | | 709/226 |
| 2015/0120887 A1 | 4/2015 | Hu et al. | |
| 2015/0134824 A1 | 5/2015 | Mickens et al. | |
| 2015/0186069 A1* | 7/2015 | Sharma | G06F 3/0631 |
| | | | 711/103 |
| 2015/0280980 A1* | 10/2015 | Bitar | H04L 67/34 |
| | | | 709/226 |
| 2015/0288753 A1 | 10/2015 | He et al. | |
| 2015/0378848 A1* | 12/2015 | Kaneko | G06F 11/142 |
| | | | 714/19 |
| 2015/0381426 A1* | 12/2015 | Roese | G06F 9/5077 |
| | | | 709/226 |
| 2016/0124763 A1* | 5/2016 | Tsirkin | G06F 9/544 |
| | | | 718/1 |
| 2016/0380921 A1* | 12/2016 | Blagodurov | G06F 3/0631 |
| | | | 709/226 |

OTHER PUBLICATIONS

Anonymous, "System and method to optimize cloud resources using variable tiering scheme," IP.com No. 000239769, 2014.
Anonymous, "Method of selecting from candidate pool for cloud transactions," IP.com No. 000230760, 2014.
Anonymous, "System and method to create profile-aware virtual machine pool in cloud environment," IP.com No. 000227780, 2014.
Abali, et al, "Disaggregated and optically interconnected memory: when will it be cost effective?," Mar. 3, 2015.
Ali, et al, "Energy efficient disaggregated servers for future data centers," 2015 IEEE.

\* cited by examiner

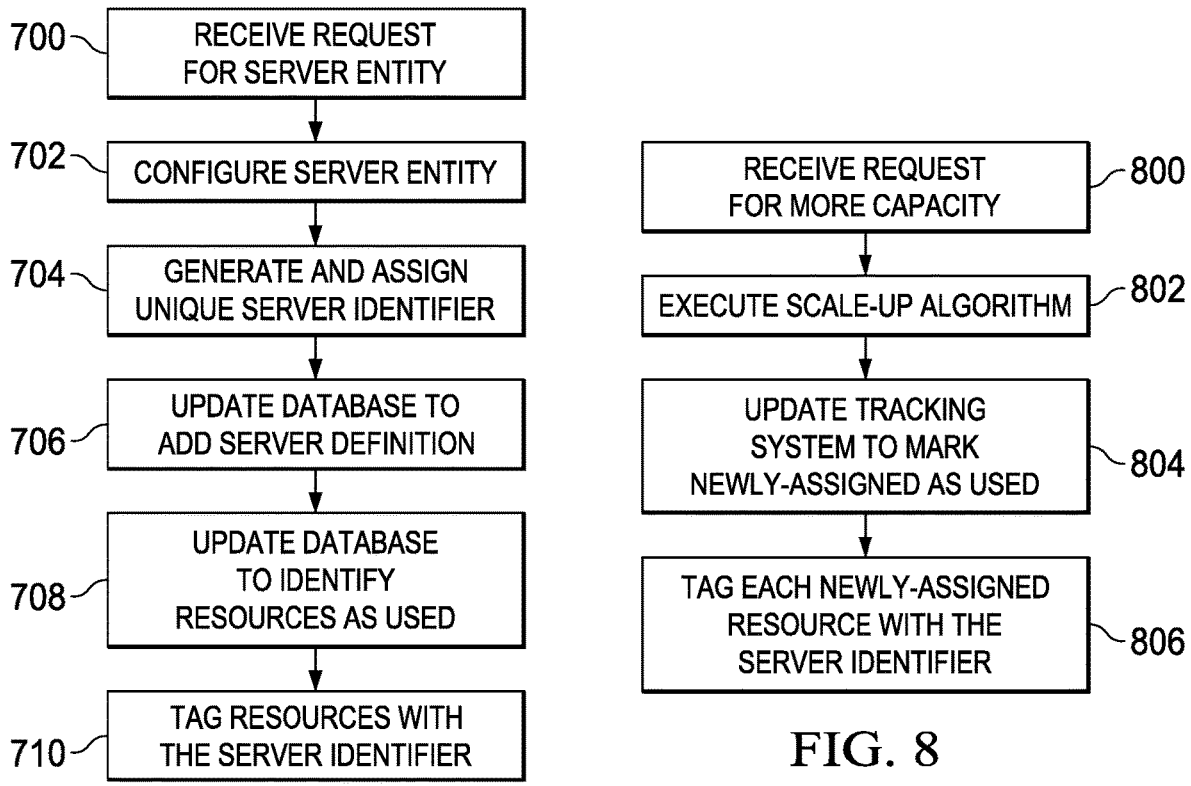
FIG. 7
FIG. 8
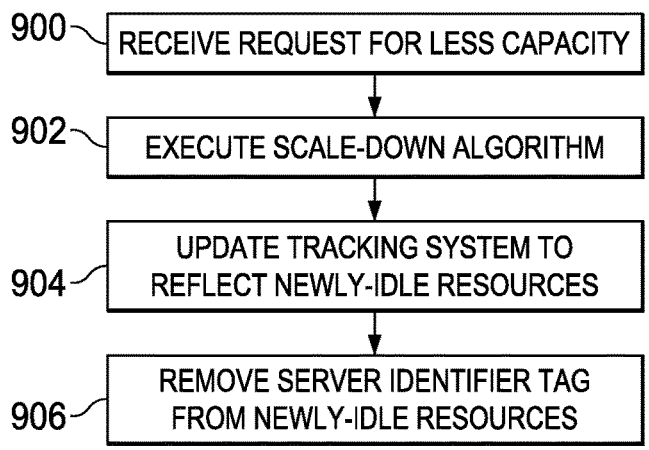
FIG. 9

SPECIFYING A DISAGGREGATED COMPUTE SYSTEM

BACKGROUND OF THE INVENTION

Technical Field

This disclosure relates generally to data processing systems in a data center operating environment.

Background of the Related Art

A well-known information technology (IT) delivery model is cloud computing, by which shared resources, software and information are provided over the Internet to computers and other devices on-demand. Cloud computing significantly reduces IT costs and complexities while improving workload optimization and service delivery. With this approach, an application instance is hosted and made available from Internet-based resources that are accessible, e.g., through a conventional Web browser over HTTP. Cloud compute resources typically are housed in large server farms that run one or more network applications, typically using a virtualized architecture wherein applications run inside virtual servers, or so-called "virtual machines" (VMs), that are mapped onto physical servers in a data center facility.

Within the data center itself, a data center network typically is architected according to a hierarchical design comprising several layers of electrical switches, namely, access, aggregate and core layers. At a front end of the data center, content and load balancing switches are connected to the Internet through gateway routers, while at the back end, they are linked to core switches. Typically, the core switches are linked to aggregate switches, and the aggregate switches are connected to rack switches. Each rack switch is connected to the servers in the rack. The switches in the data center network operate usually over an electronic switch fabric, and the links between them either are copper cables or optical fibers. When a request comes from the external network, it first comes to the load balancing and content switches, which route the request to the appropriate servers. To fulfil the request, the servers can coordinate with other servers within the same or different racks. For example, the application servers can coordinate with the database servers to process the request. After completing the request, the response is sent to the external network through the gateway routers.

Conventional data center architectures such as described face many challenges including, without limitation, scalability, fault tolerance and energy efficiency. As a consequence, many are hard-pressed to handle the growing demand of cloud computing.

Data center performance also is impacted by the nature of the hardware systems that comprise the data center. Currently, hardware systems are prepackaged with a pre-defined number of CPUs and memory, which limits flexibility. For example, in a typical virtual machine environment, the number of virtual CPUs is defined, and memory is allocated. While a number of virtual CPUs can be changed in such an environment, there is no way to specify which physical CPUs are to be used, or how to increase the number of physical CPUs.

Additionally, often there is need to dynamically scale-up or -down physical hardware capacity so that virtual and non-virtual capacity can be adjusted without any downtime and customer impact. Consider, for example, the case of an application server that includes an in-memory, column-oriented, relational database management system (e.g., a HANA server). If it is desired to add more CPUs or other resources to such a server in a non-virtualized environment, a hardware box has to be built instead of being able to add more resources dynamically. A similar issue exists in a virtualized environment because, typically, the hypervisor capacity is bound to the underlying capacity of the hardware box.

Another known approach to data center resource provisioning involves use of pre-built servers that have specific components pre-assembled from a manufacturer. In this approach, a data center customer can select from list of menus of options (including identifying what resources a server should have), but the match typically is done by the user manually selecting a closest box having the desired features. The selected box, however, may not be available, in which case a higher value box is then used to satisfy the customer's needs. The process requires availability at each physical data center of a very large inventory of different types of servers, each having many possible combinations of resources (i.e. processor types, memory, storage GPUs, and so forth). This is undesirable from a cost and resource management perspective. Moreover, and even when such inventory is available, the selection and provisioning process is time-consuming and complex.

Therefore, there remains a need to provide techniques to address these and other problems associated with the prior art.

BRIEF SUMMARY

According to a first aspect of this disclosure, a method is provided for assigning resources in a compute environment. The method begins by providing a set of server resource pools, wherein a server resource pool comprises a set of resources of a common type (e.g., a compute pool, a memory pool, etc.). In response to receipt of a request, a server entity is defined. The server entity is composed of one or more resources selected from one or more of the server resource pools. The one or more resources are selected from the one or more of the server resource pools based on a projected workload associated with the request. Thereafter, and as the workload is being processed, information collected from monitoring the one or more resources as the workload is received. Based on the information collected from the monitoring, a composition of the server entity is adjusted based on a change in the workload.

Preferably, a unique server identifier is associated to the server entity and used for tracking purposes. The unique server identifier is also associated to each of the resources selected for the server entity. The unique identifier is updated to reflect any adjustment of the composition of the server entity.

According to a second aspect of this disclosure, an apparatus for assigning resources in a compute environment is described. The apparatus comprises a set of one or more hardware processors, and computer memory holding computer program instructions executed by the hardware processors to perform a set of operations such as the steps described above.

According to a third aspect of this disclosure, a computer program product in a non-transitory computer readable medium for use in a data processing system for assigning resources in a compute environment is described. The computer program product holds computer program instructions executed in the data processing system and operative to perform operations such as the steps described above.

According to a fourth aspect of this disclosure, a data center facility is described. The data center comprises a set of server resource pools, a disaggregated compute system, a database, and a tracking system. The server resources pools comprise at least a compute pool, and a memory pool. The disaggregated compute system comprises processors selected from the compute pool, computer memories selected from the memory pool, and an optical interconnect. The database stores a unique server identifier defining the disaggregated compute system. The unique server identifier is associated in the database with an identifier for each of the resources assigned to the server (e.g., processors and computer memories) in the disaggregated compute system. The tracking system is responsive to workload changes in the disaggregated compute system to selectively adjust the composition of the processors or the computer memories therein according to a workload demand. In operation, the unique server identifier is updated in the database to reflect adjustment of the composition of the disaggregated compute system.

Preferably, and as an optional aspect, in the above-described data center, the processors and computer memories are selected based on one of: their locality, a best fit to an anticipated workload, and future expansion requirements associated with the data center facility.

The above-described techniques and technical features provide significant advantages. They enable initial resources to be appropriately allocated in the data center based on projected need, and dynamic scale-up or scale-down of physical or virtual hardware capacity without any downtime, and with minimal or no customer impact. Because a server entity is built-up from allocation of a subset of processors, a subset of memory, etc., only those resources that are needed to handle the workload are used. Further, when scale-up is required, the system obtains the additional resources needed, preferably based on locality considerations (i.e., where the additional resources are) to ensure continued good performance at low cost. Because the approach leverages disaggregated servers, these advantages are enable the data center to realize greater modularity, higher resource utilization, lower costs, and better performance. Server entities are built as needed, and the resources that comprise these entities are varied dynamically, also on-demand. The approach solves the workload allocation issues that result from use of traditional servers, which suffer from resource fragmentation when one or more resources therein become underutilized due to mismatched or changing workload requirements. By using shared resource pools and the resource allocation methods described herein, the servers are constructed dynamically and on-demand by allocating from these resource pools according to the workload's requirements.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 7 depicts a process flow for new server allocation according to a first embodiment;

FIG. 8 depicts a process flow for a server scale-up resource allocation method according to a second embodiment; and FIG. 9 depicts a process flow for a server scale-down resource allocation method according to a third embodiment.

DETAILED DESCRIPTION OF AN ILLUSTRATIVE EMBODIMENT

The techniques of this disclosure preferably are implemented within the context of a "disaggregated" compute system wherein a "disaggregated server"—sometimes referred to herein as a "server entity"—is composed or constitutes server resources selected from (or assigned from) shared server resource pools, namely, one or more of: a compute pool, a memory pool, an accelerator pool (e.g., a GPU accelerator, a network accelerator, etc.), a storage pool, and so forth. As the nomenclature suggests, a "compute" pool typically constitutes physical processors (such as CPUs), a "memory" pool typically constitutes physical memory devices (such as dual-inline-memory modules (DIMM)), etc. A given shared pool preferably includes just the particular resource types, but a particular resource pool may be composed of one or more resource sub-types. The notion of a "pool" is not intended to be limiting, as the common resources may be collected, aggregated or otherwise combined in any suitable manner. Further, a "pool" may be a dedicated set of resources that have the common type or sub-type, or some ad hoc collection of such resources. Preferably, a particular server entity comprises server resources from one or more of the server resource pools.

In a preferred embodiment, and as now described below, a disaggregated compute system in which the teachings of this disclosure are practiced utilizes optical (as opposed to electrical) interconnects for memory, although this is not a limitation.

Typically, the shared resource pools are available within the physical confines of a particular data center, although this likewise is not a limitation. Thus, the shared resource pools themselves may be shared across physical data centers. Further, a particular server entity is not required to be composed of resources from each of the server pools.

Switching Optically-Connected Memory Architecture

By way of background, but not by way of limitation, the following describes a representative computer environment in which the techniques of this disclosure (described below) may be practiced.

Figure 1:
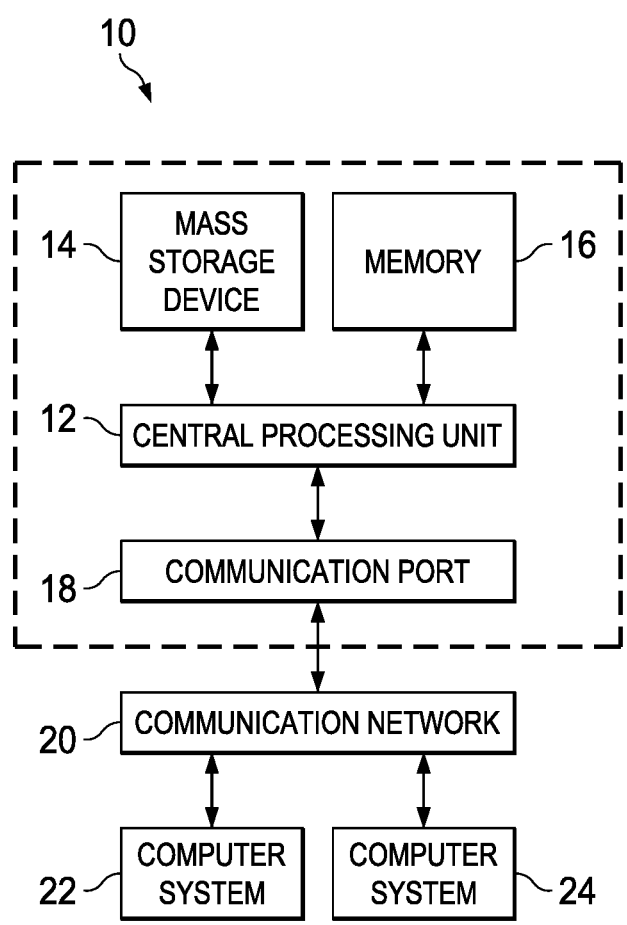
FIG. 1 depicts an exemplary block diagram illustrating a computing system environment in which exemplary aspects of the disclosure may be implemented.

Turning now to FIG. 1, exemplary architecture 10 of a computing environment in which the disaggregated compute system of this disclosure may be implemented is depicted. The computer system 10 includes central processing unit (CPU) 12, which is connected to communication port 18 and memory device 16. The communication port 18 is in communication with a communication network 20. The communication network 20 and storage network may be configured to be in communication with server (hosts) 24 and 22 and storage systems, which may include storage devices 14. The storage systems may include hard disk drive (HDD) devices, solid-state devices (SSD) etc., which may be configured in a redundant array of independent disks (RAID). The operations as described below may be executed on storage device(s) 14, located in system 10 or elsewhere and may have multiple memory devices 16 working independently and/or in conjunction with other CPU devices 12. Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 24 and 22. In addition, memory device 16 and the CPU 12 may be embedded and included in each component of the computing system 10. Each storage system may also include separate and/or distinct memory devices 16 and CPU 12 that work in conjunction or as a separate memory device 16 and/or CPU 12.

Figure 2:
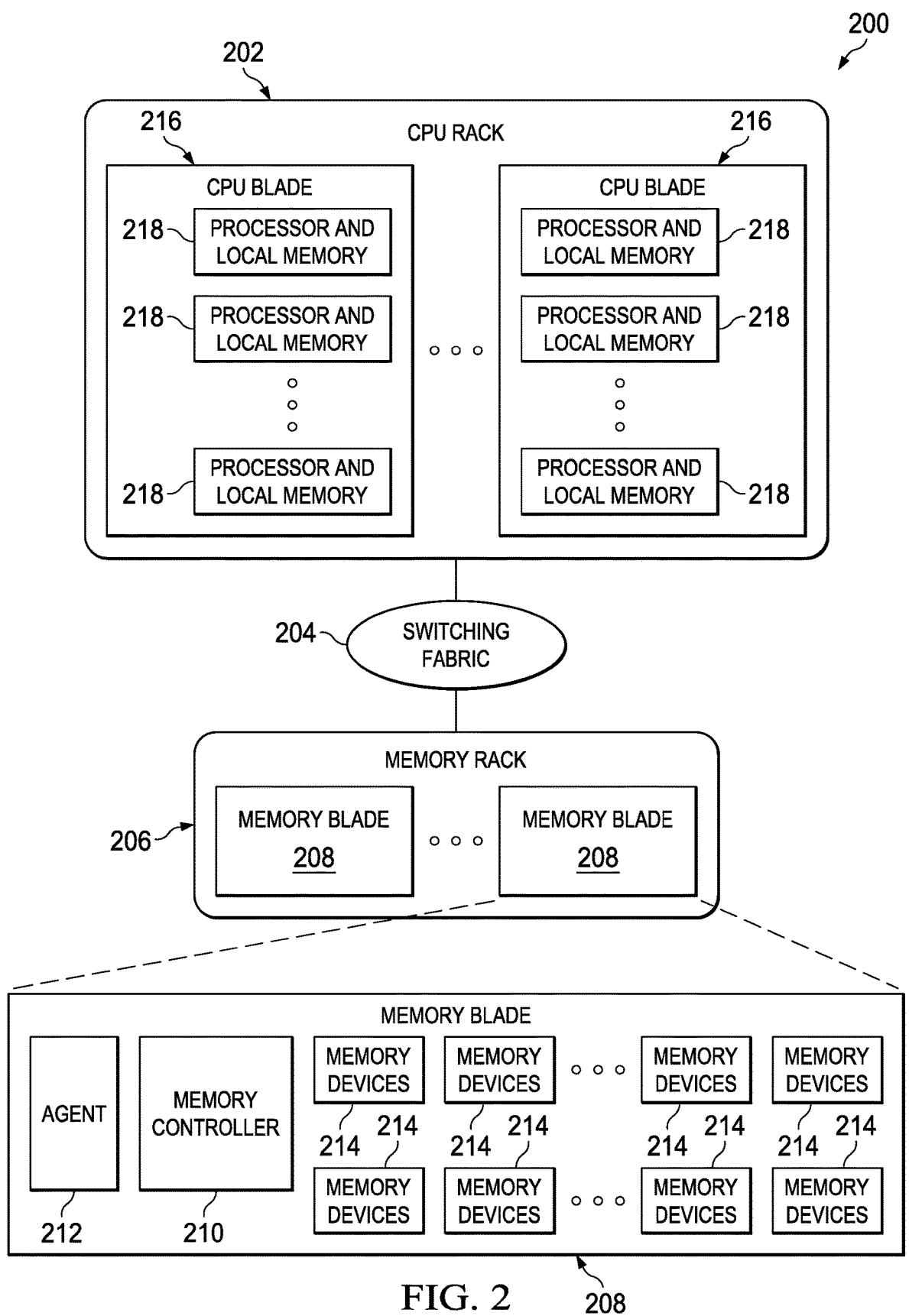
FIG. 2 is an exemplary block diagram of a hardware structure of an optically-connected memory system in which aspects of the illustrative embodiments may be implemented.

FIG. 2 is an exemplary block diagram 200 showing a hardware structure of an optically connected memory system in a computer system. The segregation of memory 214 from the CPU 218 through an optical interconnection fabric 204 is feasible due to the high bandwidth distance product of the optical link 204. In such an Optically-Connected Memory (OCM) system 200, the CPU 218 and memory 214 are organized into separate racks 202 and 208 connected through optical links and at least one switching fabric 204. In the memory rack 206, memory blades 208 are arranged and communicatively coupled to other memory blades and a processor (CPU) rack 202. Each memory blade 208 houses multiple memory devices 214, an agent 212, and a memory controller 210. The CPU rack 202 includes processor blades 216 with each of the processor blades 216 communicatively coupled to other processor blades 216 and the memory rack 206. The processor blades 216 include processors 218, with each processor 218 containing local memory (not shown). The processors 218 (and respective physical computation nodes) inside a processor rack 216 are connected locally by a known fast interconnection means (not shown), which could be a direct connected network with some topology between the processors' 218 physical computation nodes within the processor blades 216, or a switch, through memory via a cache coherent symmetric multiprocessor (SMP) fabric, or a combination of the above. Each of the processors 218, processor blades 216, memory 214, and memory blades 208, share a number of optical external links. These external links are made for optimizing a point-to-point connection within the optical-switching fabric at very high bandwidth. This optimization may be in the physical implementation used, or in the protocol chosen to facilitate such high bandwidth, and preferably it has the ability to support memory switching within one physical link or multiple physical links to look like one high bandwidth physical link made of a few physical links. Because these external links typically are circuit-switched via at least one optical switch 204 that will not be aware of the data or content thereof, these should use a very lightweight communication protocol.

The physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect in the optics domain, the light beams within these external links, regardless of their number of wavelength, protocol, and signaling speed. Preferably, and in the embodiment depicted, these external links are common to all memory blades and processor blades.

In the preferred architecture, at least one optical circuit switch is shared between the optical external links. Also, several independent circuits may be established between the processors and the memory blades sharing the optical circuit switch. These external links are made for optimizing a point-to-point connection at very high bandwidth. This optimization may be in the physical implementation used in the protocol chosen to facilitate such high bandwidth and has the ability to support aggregation of multiple streams within one physical link or multiple physical links to look like one high bandwidth physical link made of a few physical links. Because these external links are circuit switched via an all optical switch that will not be aware of the protocol, data or content thereof, a very light weight communication protocol is used. Furthermore, the physical properties of these external links may require the use of multiple optical wavelengths in a WDM (wavelength division multiplexer), which are all coupled into one fiber or one external link, but are separable at both ends. The mirror-based micro electro mechanical system "MEMS" optical circuit switch "OCS" will deflect, in the optics domain, the light beams within these external links regardless of their number of wavelength, protocol, and signaling speed. These external links are common to all processors, blades, memory, and independent circuits, such that any memory blade/processor blade may pass information on one or all of these external links, either directly or by passing through the interconnected processor blades. In one exemplary embodiment, circuit-switching switches are used. Circuit switching switches do not need to switch frequently, and thus may be much simpler to build, and can use different technologies (e.g., all optical, MEMS mirror based) to dynamically connect between the circuits, memory, and processor blades.

These types of external links (not shown) and the dynamic switching enable very high throughput (e.g., high bandwidth) connectivity that dynamically changes as needed. As multi-core processing chips require very high bandwidth networks to interconnect the multi-core processing chips to other such physical processing nodes or memory subsystem, the exemplary optically-connected memory architecture plays a vital role in providing a solution that is functionally enabled by the memory switching operations.

The optically-connected memory architecture 200 engenders numerous benefits: (a) transparent memory capacity changes across the system nodes, (b) eliminate notion of worst-case provisioning of memories and allow the applications to vary memory footprints depending on the workloads, and (c) decouple the CPU downtime from the memory module failure, thus increasing the CPU availability. As will be described below, an architecture for memory management techniques is provided. As shown in FIG. 2, the processor blades 202 host a number of processors 218, whereas the memory modules 241 are packed (e.g., arranged) in the memory blades 208. The processor blades 216 and memory blades 208 are organized in separate racks 202 and 206, which are interconnected through an optical switching fabric 204. Each of the processors 218 in the CPU blade 202 may have a local memory pool 310a-n, which is used for faster memory accesses. A memory blade 208 can integrate, in addition to dynamic random-access memory (DRAM) memory devices, alternate memory devices, such as Flash or phase-change-memory, without any changes to the CPU blades 216.

Figure 3:
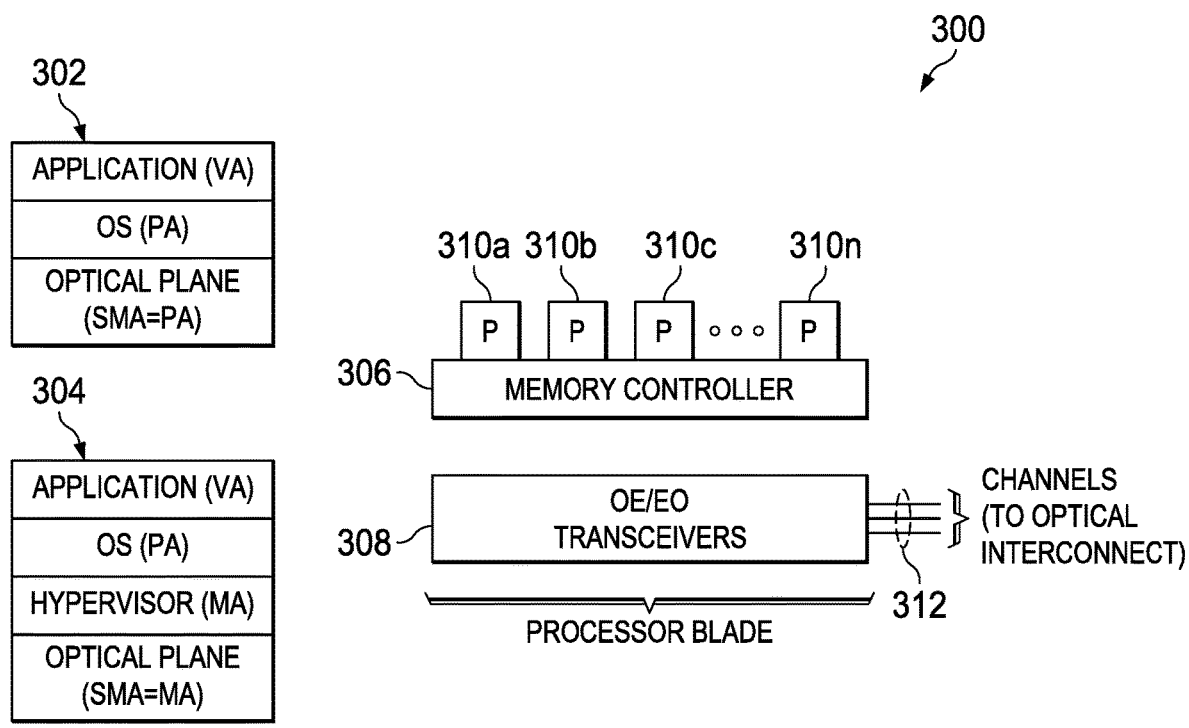
FIG. 3 depicts a block diagram illustrating a hardware structure of a processor design in the optically-connected memory system in FIG. 2.
Figure 4:
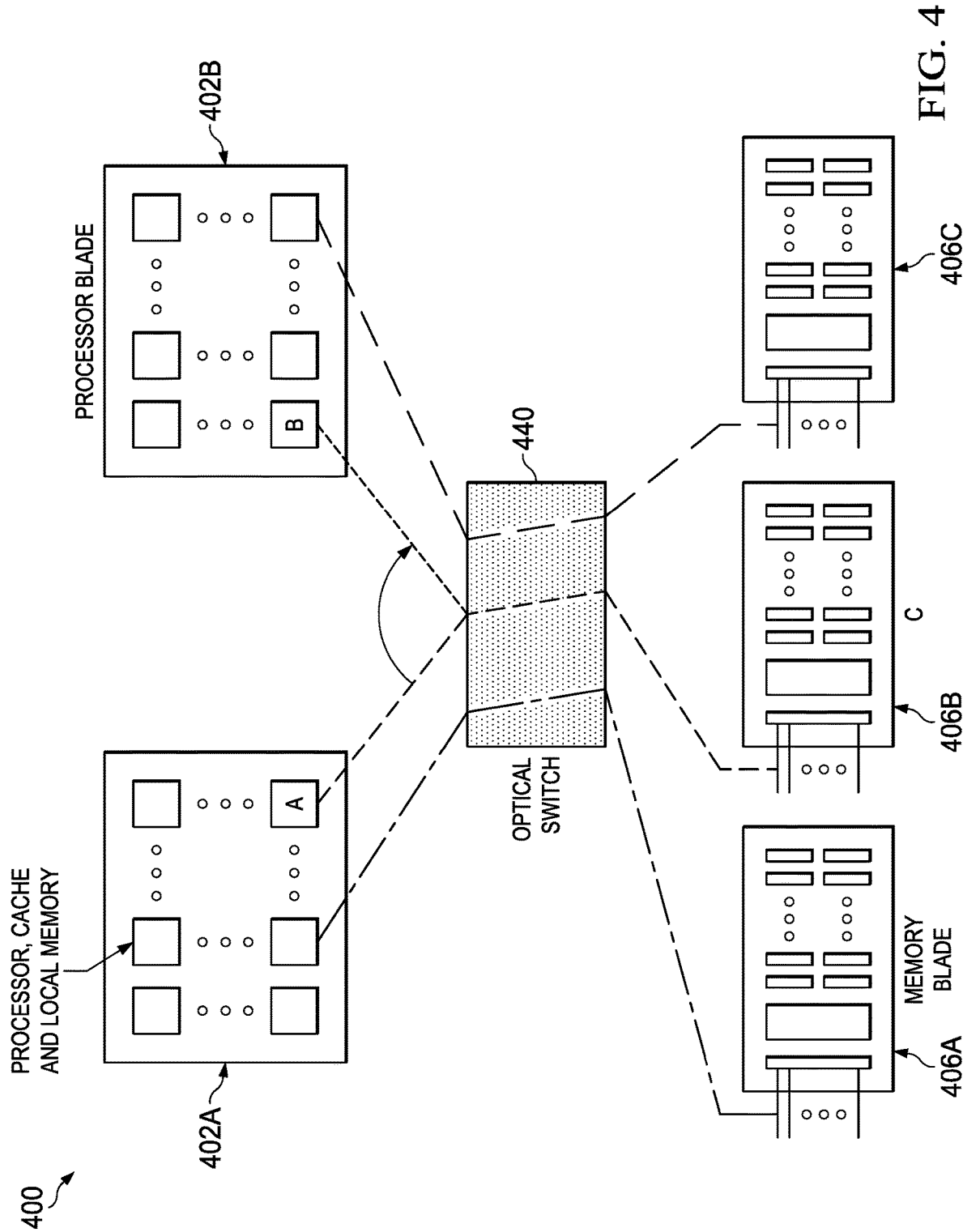
FIG. 4 is a block diagram illustrating a hardware structure for accessing memory at the processor.

Turning now to FIG. 3, FIG. 3 is a block diagram 300 showing a hardware structure of a processor design in the optically-connected memory system in a computer system. As illustrated in FIG. 3, the processor side design 300 illustrates: software stack in system (without virtualization) 302 and 304 (with virtualization), and the processor blade communicates with remote memory blades through optical transceiver 308 and 312. There is a memory controller 306 associated with local memory pool 310a-n. If a System Memory Address (SMA) space (as shown in 302 and 304 of FIG. 3) is above a certain, predefined limit, the SMA is mapped to a Remote Memory Address (RMMA) space 408 (as shown in FIG. 4) and the access request is routed to the remote memory blade through the proper channels. It should be noted that the memory blade 208 (see FIG. 2) maintains a separate address space called Remote Memory Address (RMMA) space.

In an optically-connected memory system (see FIG. 2 200), each processor node 218 maintains, for both remote and local memory, the SMA space. The processor node 218 maps the local physical memory to the lower portion of this address space. The remote memory is mapped to the available (i.e., higher) SMA address space (shown in 302 and 304). At the remote memory side, the memory blade 208 maintains the RMMA. Therefore, each memory access at the processor side should first be mapped to the SMA space (as shown in 302 and 304 of FIG. 3). If the SMA (as shown in 302 and 304) corresponds to the remote memory, the SMA (as shown in 302 and 304 of FIG. 3) is mapped to the RMMA, and this RMMA is sent to the remote memory blade 208. The optical plane translates the SMA (as shown in 302 and 304 of FIG. 3) to the respective RMMA and interacts with the remote memory, as illustrated in FIG. 3.

The processor blade (as shown with components 306, 308, and 310a-n in FIG. 3) connects to the remote memory through Electrical-to-Optical (EO)/Optical-to-Electrical (OE) transceivers 312 which are connected to, for example, a Northbridge™ chipset. Note that in a virtualized system the SMA (as shown in 302 and 304 of FIG. 3) corresponds to the Machine Address (MA) (as shown in 302 and 304), and in a system without virtualization the SMA (as shown in 302 and 304 in FIG. 3) corresponds to the physical address (PA) (as shown in 302 and 304 of FIG. 3). As shown in the FIG. 3, each processor blade (shown with components 306, 308, and 310a-n) may have simultaneous connections to multiple memory blades through separate channels. Here, in case of a single-mode optical fiber, a channel corresponds to a separate optical transceiver, whereas with wavelength-division multiplexing (WDM) a single transceiver may provide multiple channels.

In an optically-connected system (as seen in FIG. 2 200), processor nodes access remote memories through independent circuits established between the processor nodes and the remote memory blades. Turning now to FIG. 4, an exemplary block diagram 400 showing a hardware structure for switching memory through an optical interconnection fabric in a computer system is depicted. Processor B 402B establishes a circuit with the remote blade C 406B and gains access to the data previously held by processor A 402A. As outlined above in FIG. 2-4, a processor node has multiple channels to the remote memory blades; also, each of the memory blades is equipped with multiple channels, enabling the memory blades to be shared across multiple processor nodes. The optical channels (in a memory blade or a processor node) are provided by one or more optical transceivers. A processor node 402 (shown as 4027A and 402B) can allocate memory from a remote memory blade by initiating a circuit with the memory blade 406 (shown as 406A-C) and sending the memory request to the remote memory controller. In such a memory system, a processor node 402 holding super pages within a remote memory blade can signal another processor to establish a circuit with the remote memory blade 406 (shown as 406A-C) initiating a transfer of memory space to the latter processor node. The former processor node (e.g., processor A 402A) can send the RMMA address space to the receiving processor node (e.g., processor B 402B), which can access the same data resident on the supplied address space. The sending processor may tear down (e.g., disconnect) the circuit with the remote memory blade 406 (shown as 406A-C) if it no longer requires any super pages at that memory blade (e.g., memory blade 406B). Such a process of transferring address space across processor nodes is referred to as memory switching. The memory switching process is shown in FIG. 4, where a processor node A 402A sends data stored in a remote memory blade C 406 to a processor node B 402B. The processor B 402B initiates a circuit with the remote memory blade C 406. Note that as a memory blade 406 may have multiple channels, the memory space of the memory blade 406 may be shared across multiple processor nodes, each memory space occupying a non-overlapping portion of the total space within the memory blade 406. Also, the source and destination side of memory switching may be referred to as switch-out and switch-in operations, respectively.

While the above-described compute environment is preferred, it is not intended to be limiting. Aspects of the disaggregated compute system of this disclosure may be implemented in a data center that provides a conventional cloud computing model of service delivery. Thus, for completeness, the following section provides additional details regarding cloud computing.

Cloud Computing

Cloud computing enables convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models, all as more particularly described and defined in "Draft NIST Working Definition of Cloud Computing" by Peter Mell and Tim Grance, dated Oct. 7, 2009.

In particular, the following are typical Characteristics:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The Service Models typically are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The Deployment Models typically are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure comprising a network of interconnected nodes. In particular, in a cloud computing node there is a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed cloud computing environments where tasks are performed by remote processing devices that are linked through a communications network. In a distributed cloud computing environment, program modules may be located in both local and remote computer system storage media including memory storage devices.

A typical cloud computing environment has a set of high level functional components that include a front end identity manager, a business support services (BSS) function component, an operational support services (OSS) function component, and the compute cloud component. The identity manager is responsible for interfacing with requesting clients to provide identity management, and this component may be implemented with one or more known systems, such as the IBM Security Federated Identity Manager (TFIM) that is available from IBM Corporation, of Armonk, N.Y. In appropriate circumstances TFIM may be used to provide federated single sign-on (F-SSO) to other cloud components. The business support services component provides certain administrative functions, such as billing support. The operational support services component is used to provide provisioning and management of the other cloud components, such as virtual machine (VM) instances. The cloud component represents the main computational resources, which are typically a plurality of virtual machine instances that are used to execute a target application that is being made available for access via the cloud. One or more databases are used to store directory, log, and other working data. All of these components (included the front end identity manager) are located "within" the cloud, but this is not a requirement. In an alternative embodiment, the identity manager may be operated externally to the cloud. The service provider also may be operated externally to the cloud.

Some clouds are based upon non-traditional IP networks. Thus, for example, a cloud may be based upon two-tier CLOS-based networks with special single layer IP routing using hashes of MAC addresses. The techniques described herein may be used in such non-traditional clouds.

Figure 5:
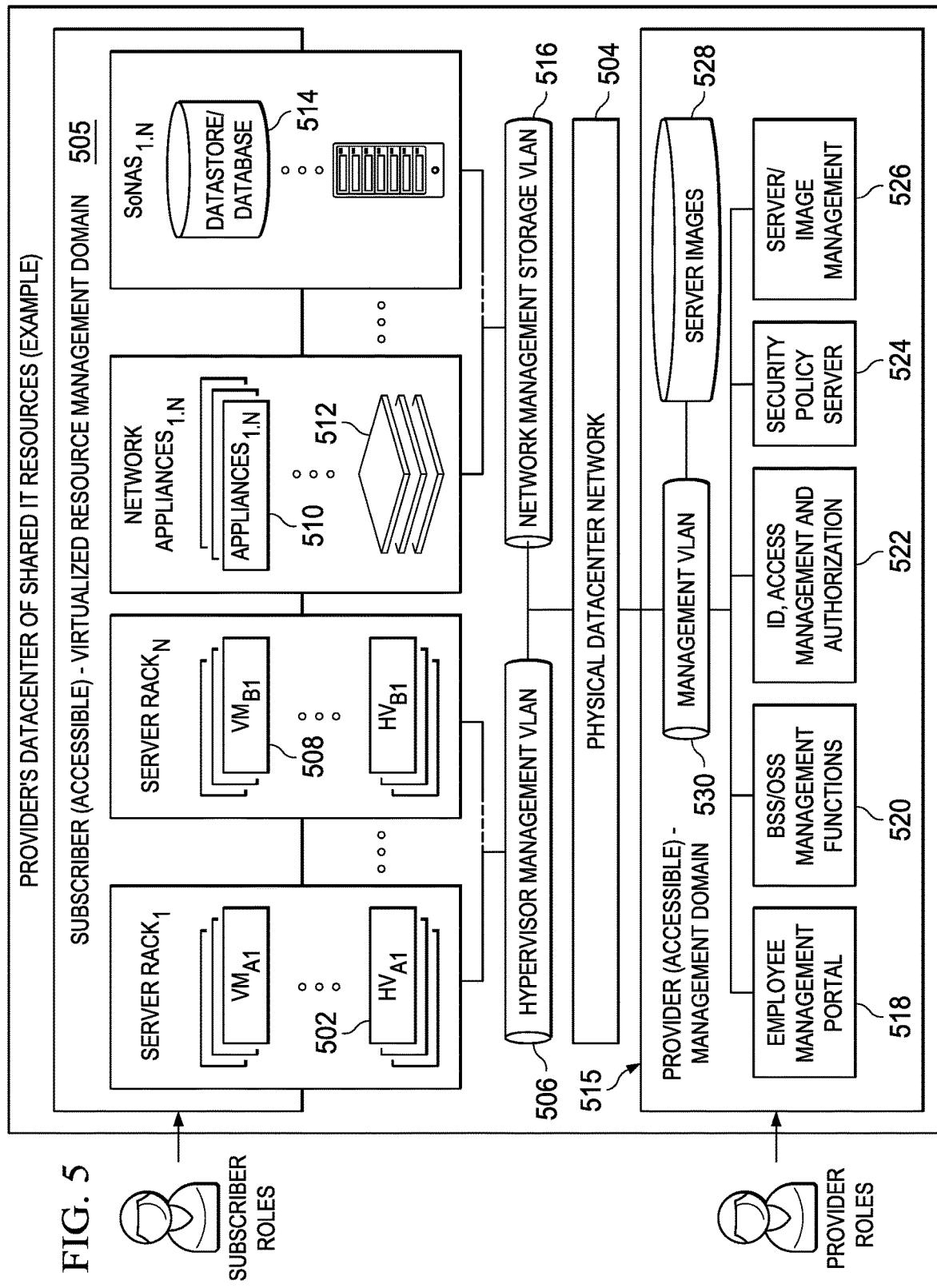
FIG. 5 depicts a disaggregated compute system according to this disclosure.

FIG. 5 illustrates a typical IT infrastructure that supports virtualization of resources and in which the below-described techniques of this disclosure also may be implemented in whole or in part. For purposes of explanation, the IT datacenter that provides shared (public) resources is the "provider" and a customer or company that uses these shared resources to host, store and manage its data and applications (in all forms) is the "subscriber" (or "customer" or "tenant"). In FIG. 5, an example virtual machine hosting environment (alternately referred to herein as a data center or "cloud") is illustrated. This environment comprises host machines (HVs) 502 (e.g., servers or like physical machine computing devices) connected to a physical datacenter network 504, typically via a hypervisor management VLAN 506. Although not depicted explicitly, typically the environment also includes load balancers, network data switches (e.g., top-of-rack switches), firewalls, and the like. As shown in FIG. 5, physical servers 502 are each adapted to dynamically provide one or more virtual machines (VMs) 508 using virtualization technology. Such technology is available commercially, e.g., from VMware® or others. Server virtualization is a technique that is well-known in the art. As depicted, multiple VMs can be placed into a single host machine and share the host machine's CPU, memory and other resources, thereby increasing the utilization of an organization's data center. In this environment, tenant applications 510 are hosted in network appliances 512, and tenant data is stored in data stores and databases 514. The applications and data stores are connected to the physical datacenter network 504, typically via a network management/storage VLAN 516. Collectively, the virtual machines, applications and tenant data represent a subscriber-accessible virtualized resource management domain 505. Through this domain, the subscriber's employees may access and manage (using various role-based privileges) virtualized resources they have been allocated by the provider and that are backed by physical IT infrastructure. The bottom portion of the infrastructure illustrates a provider-accessible management domain 515. This domain comprises a provider employee management portal 518, the BSS/OSS management functions 520, various identity and access management functions 522, a security policy server 524, and management functions 526 to manage the server images 528. These functions interface to the physical datacenter network via a management VLAN 530. The provider's employees have specialized privileges (and perhaps specific clients/networks) from which they have access to the Operational and Business Support Services (OSS/BSS) that they use to manage the IT datacenter infrastructure (e.g., hardware and software installations, configurations, monitoring, technical support, billing, and the like).

Generalizing, the cloud computing infrastructure provides for a virtual machine hosting environment that comprises host machines (e.g., servers or like physical machine computing devices) connected via a network and one or more management servers. Typically, the physical servers are each adapted to dynamically provide one or more virtual machines using virtualization technology, such as VMware ESX/ESXi. Multiple VMs can be placed into a single host machine and share the host machine's CPU, memory and other resources, thereby increasing the utilization of an organization's data center. Among other tasks, the management server monitors the infrastructure and automatically manipulates the VM placement as needed, e.g., by moving virtual machines between hosts.

In a non-limiting implementation, representative platform technologies are, without limitation, IBM System X® servers with VMware vSphere 4.1 Update 1 and 5.0.

Method and System for Specifying a Disaggregated System

With the above description providing several representative operating environments, the techniques of this disclosure are now described.

According to the techniques of this disclosure, server resources in or across one or more data centers are disaggregated into shared server resource pools, namely, one or more of: a compute pool, a memory pool, an accelerator pool, a storage pool, and the like. Servers are constructed dynamically, for example, on-demand and based on workload requirements, by allocating from these resource pools. According to this disclosure, a disaggregated compute system of this type keeps track of resources that are available in the shared server resource pools, and manages those resources based on that information.

According to one embodiment, a tracking mechanism associated with the disaggregated compute system includes a database. The database stores data that tracks resource state or status (e.g., idle or used CPUs, memory, accelerator, and other components) of the various resources that define a server available from the resource pools. Additionally, the database stores a data record (or, more generally, a data set) that, for each defined server (sometimes referred to as a "server entity"), identifies the resources (e.g., the CPU(s), memory, accelerator, or other components) that comprise the server. Preferably, the data record is associated with an identifier, such as a unique server ID, and each resource that comprises the server is associated in the database with that unique server identifier. The individual components of the resource pools also include identifiers that are tracked in the database. The resource-specific identifiers provide information regarding the resource status, attributes, relationship to other resources, and the like. Thus, the database, which may be centralized or distributed, acts a repository of information regarding server entities, the server pools, and the various resources that comprise a particular server entity.

In response to a request for data center resources, e.g., when allocating a new server, a server entity is defined by selecting resources from the one or more resource pools. The resources may be selected based on a projected need or specified demand associated with the request, or some other criteria. The server entity is associated with the unique server ID, which is stored in the database together with the identifiers for the resources that comprise the server entity. The server entity may then be scaled up or down as necessary based on the workload requirements of the request or one or more related or associated requests.

Thus, for example, as the request is processed, or as additional related requests are received for processing, the tracking system monitors usage to determine if an adjustment to the resources comprising the server entity is needed. When, based on the monitoring, the tracking system determines that an adjustment in the server entity components is necessary, the adjustment is carried out, e.g., by changing the allocation of resources that are associated with the server entity. Thus, for example, when additional compute and memory are needed (scale-up), the tracking system (by itself, or by cooperation with other resource provisioning systems in the data center) adjusts the server entity, e.g., by selecting additional processors and memory, which are then added to the server entity. These additional processors and memory may be selected based on one or more criteria, such as load, proximity to the existing resources that comprise the server entity, availability, and the like, as indicated by the information being maintained and tracked in the database. When, on the other hand, the monitoring indicates that fewer resources are required (scale-down), the tracking system adjusts the server entity, e.g., by de-selecting certain processors and memory, which are then de-allocated from the server entity and returned to their respective resource pools.

Figure 6:
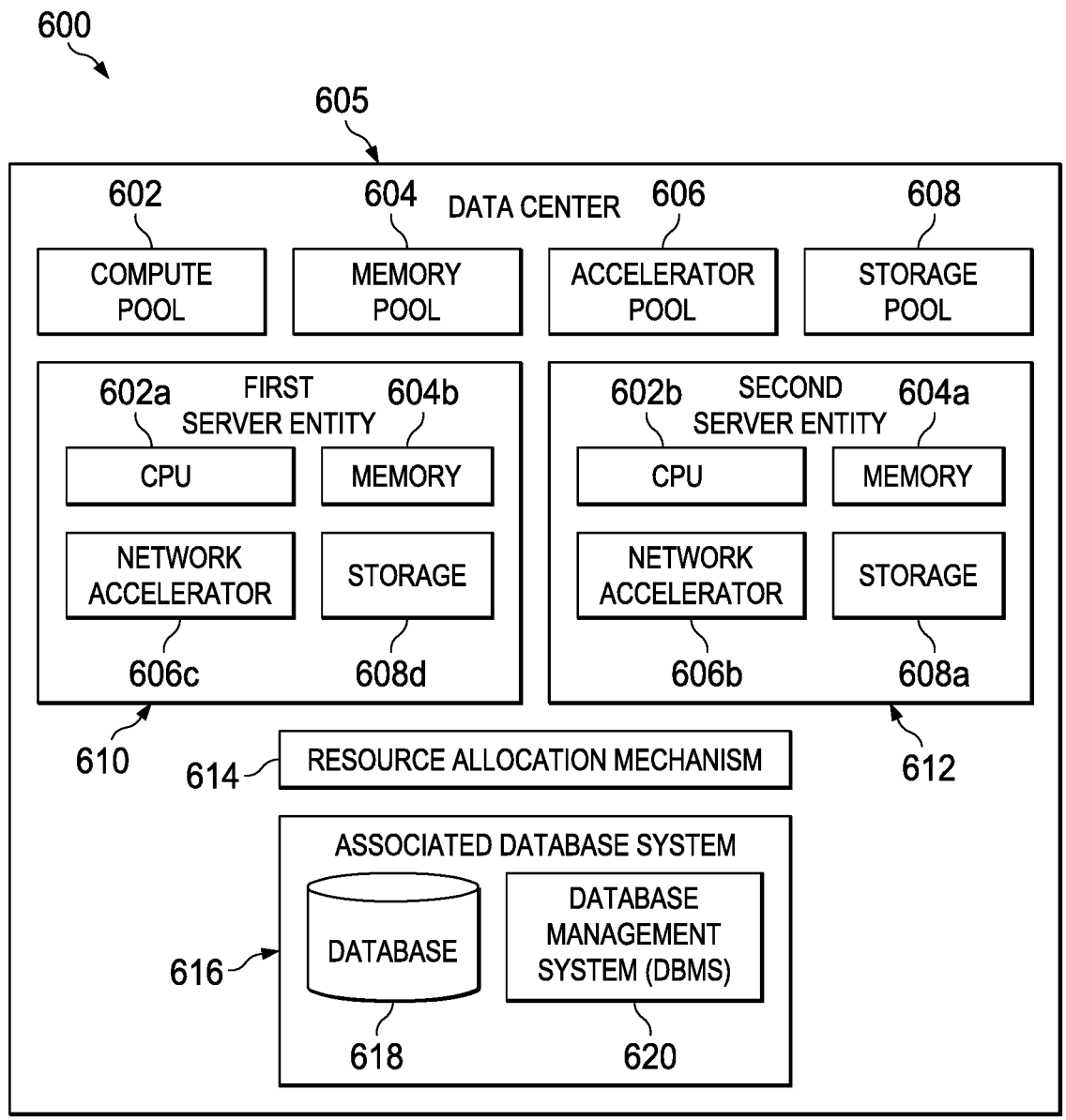
FIG. 6 depicts an alternative data center architecture in which the techniques of this disclosure may be implemented.

With reference now to FIG. 6, this disclosure provides a method and system for specifying a disaggregated compute system 600. In a preferred approach, the disaggregated compute system 600 is configured within a data center 605 in which a switching optically-connected memory architecture is used. This architecture was described above in the context of FIGS. 1-4, but it is not intended to be limiting. In the disaggregated compute system 600, there are shared server pools, e.g., a compute pool 602, a memory pool 604, an accelerator pool 606, a storage pool 608, and perhaps others. There may be a single instance of a resource pool, or multiple such instances (sometimes referred to as "multiple pools"). In the approach herein, particular servers that service customer workloads are constructed dynamically, for example, on-demand and based on workload requirements, by allocating from these resource pools. Thus, for example, a first server entity 610 may comprise CPU 602a (selected or otherwise obtained from compute pool 602), memory 604b (selected or otherwise obtained from memory pool 604), accelerator 606c (selected or otherwise obtained from accelerator pool 606), and storage 608d (selected or otherwise obtained from storage pool 608). A second server entity 612 may comprise CPU 602b, memory 604a, accelerator 606b and storage 608a. These examples are merely representative. Moreover, and as will be described, the particular server pool resources that comprise a given server entity may change.

Preferably, once a particular resource of a resource pool is associated with a given server entity, that particular resource is not available to be used to constitute another server entity. Stated another way, preferably an allocated resource of a resource pool remains associated with the server entity until it is de-allocated, at which point the resource is returned back to the resource pool and can be used again by another server entity. Although not intended to be limiting, preferably a server entity (once created) is associated with one and only one data center customer (tenant). In other words, server entities preferably are not shared across tenants.

To manage such allocations and de-allocations, and according to this disclosure, the disaggregated compute system 600 has the capability to keep track of resources that are available in the shared server resource pools and that are allocated or de-allocated to the various server entities. To this end, the disaggregated compute system 600 comprises (or has associated therewith) a tracking system comprising a resource allocation mechanism 614, and an associated database system 616. Generally, the tracking system is implemented as a data processing system, and it may operate in a standalone manner or as a component of some other system or functionality in the data center.

Typically, the resource allocation mechanism 614 is implemented in software, namely, as set of computer program instructions, executing in one or more hardware processors. The resource allocation mechanism 614 may comprise one or more sub-systems or modules, processes, programs or execution threads, and such components may be co-located or distributed. The resource allocation mechanism 614 generally is responsible for executing one or more allocation algorithms that create and manage server entities according to this disclosure. As will be described below, representative algorithms include, for example, a new server allocation algorithm that is used to perform an initial build of the server entity, a server scale-up algorithm that in the case of an existing server is used to add more resources to the existing server entity when more capacity is needed to handle the workload, and a server scale-down algorithm that in the case of an existing server is used to de-allocate (shed) resources from the existing server entity when less capacity is needed to handle the workload. One or more of such functions may be combined, and other types of algorithms may be implemented by the resource allocation mechanism 614.

The one or more algorithms that comprise the resource allocation mechanism 614 used information stored in the database system 616 to carry out the management functions. As noted above, the database system 616 stores information that tracks the state, status or other properties and attributes of the various resources in the shared server pools. In addition, the database stores information about each server entity built by the resource allocation mechanism. Generalizing, and as well-known, the database system 616 comprises a database 618, namely, a collection of data organized in one or more ways (e.g., via schemas, tables, queries, report, views and other objects), together with a database management system (DBMS) 620, which is a computer software application that interacts with the user, other applications, and the database to capture and analyze data. A general purpose DBMS enables the definition, creation, querying, update and administration of databases. A representative DBMS is IBM® DB2®.

In one embodiment, the database 618 is relational. The database stores a data record (or, more generally, a data set) that, for each defined server entity, identifies the resources that comprise the server. Preferably, the data record is associated with an identifier, a unique server ID, and each resource that comprises the server is associated in the database with that unique server identifier. Thus, continuing with the example described above, the first server entity 610 may be associated with unique server $ID_1$, while the second server 612 may be associated with user server $ID_2$, and so forth.

As also described, preferably the individual components of the resource pools also include identifiers that are tracked in the database; when a resource is allocated to a server entity, the resource's identifier then gets associated with (cross-referenced to) the server entity. Thus, continuing with the first example above, the various resource-specific identifiers for the CPU 602a, memory 604b, network accelerator 606c and storage 608d are associated (by relational tables or otherwise) with unique server ID1, which is the unique server identifier for the first server entity 610. Likewise, and continuing with the second example, the various resource-specific identifiers for the CPU 602b, memory 604a, accelerator 606b and storage 610a are associated with unique server ID2, which is the unique server identifier for the second server entity, and so forth for each server entity.

When the server entity is first built, it includes a set of one or more server pool resources selected from the server pools by the resource allocation mechanism. Thus, the unique server identifier for the server entity will have an initial set of resource-specific identifiers associated therewith. As resources are later allocated or de-allocated from the server entity, the set of constituent resource identifiers associated with a particular server entity identifier thus changes as well.

As noted above, there may be multiple instances of a resource pool. When multiple instances exist, particular resources to support the server entity are then selected from one or more of those instances. Preferably, if resources assigned to a first instance of a resource pool are used to build the server entity, when it becomes necessary to add capacity to that server entity, preferably the additional resources are also drawn from the same instance where possible.

Preferably, the resource-specific identifiers provide information regarding the resource status, attributes, relationship to other resources, and the like. Thus, the database, which may be centralized or distributed, acts as a repository of information regarding server entities, the server pools, and the various resources that comprise a particular server entity.

Although a relational database is useful for implementation, the server entity identifiers and resource-specific identifiers may be related to one another in other ways, e.g., as linked lists, data arrays, hash tables, or otherwise.

In general, the resource allocation mechanism 614 and the database system 616 work together to manage the disaggregated compute system. The resource allocation mechanism functions as a tracking system that keeps track of idle and used CPUs, memory, accelerator and other components that define a server. Additionally, the tracking system keeps a record of each defined server of what CPUs, memory, accelerator or other components are part of the server. As noted, and for the each defined server, a unique ID is specified, and the requested number of CPUs, memory and storage are selected from the pool of idle resources, e.g., based on their locality, best fit and future expansion needs as will be further described. The unique server ID, and also IDs of each of these resources, are recorded in the tracking system. Preferably, and as noted above, the used components are marked as used and are removed from the pool of idle components.

Preferably, each component of the server entity is tagged with the unique server ID with which it is a part. Thus, the component is made aware that it is a component of the server entity identified by the unique server ID.

Preferably, each request issued to the disaggregate compute system, as well as the data received in response to the request, also are tagged with the server entity ID. When, for example, the request is received at a resource, the resource then compares the server entity ID tagged to the request to the server entity ID for the resource. In other words, the component is provided with the capability to check if the request matches the server entity ID to which the component has been allocated. If so, the component recognizes the request as something that can be consumed and acted upon. When the server entity ID tagged to the request does not match the server entity ID tagged to the component, the component knows that the request can be ignored.

As will be described, the algorithms used for resource selection (new server allocation, server scale-up and server scale-down) can use common criteria to facilitate the selection, or these algorithms can differ from one another, e.g., based on the resource topology and the purpose of resource allocation. When resources are interconnected, more flexibility in allocated resources is available to the system. For resources that are not directly interconnected, preferably the algorithm(s) consider the hierarchy of resources, as well as other factors, such as number of hops, latency, cost and so forth. In the latter case, preferably the algorithm tries to minimize the number of hops.

FIG. 7 depicts a process flow for new server allocation according to a first embodiment. This process describes an illustrative new server allocation algorithm. In general, the algorithm operates by checking the pools, and determining what resource pool (and what resources therein) best fits the requirement for the server entity. As noted above, and depending on the nature and configuration of the pools themselves, it may be the case that multiple pools satisfy criteria for the server entity, in which case the new server allocation algorithm preferably allocates the resources from the pool with maximum resources available to enable future expansion of the compute system.

The new server allocation process begins at step 700 upon receipt of a request for a new server. The request may be received from a user, or some requesting entity or system. This request may be received programmatically. The new server allocation process has access to the database of information about the server pools and their associated resources. At step 702, the system allocates resources using an initial allocation algorithm. Without limitation, that initial allocation algorithm may take into consideration the number and configuration of the resource pools, whether the resources are interconnected, the nature of such interconnection, and so forth. That said, the particular initial resource allocation method utilized is not a limitation of this disclosure. At step 704, and having selected the pools and the resources therein needed, a unique server identifier (representing the new server definition that has been built) is generated. At step 706, the system then updates the tracking system to add the new server definition to the database. At step 708, the tracking system also updates the database to reflect that the resources selected for the new server entity are no longer available (i.e., they are used). At step 710, each resource associated with the new server entity defined is tagged with the unique server identifier so that it can respond to service requests that bear the matching tag.

FIG. 8 depicts a process flow for a server scale-up resource allocation method according to a second embodiment. In general, and as noted above, the algorithm operates to add more resources to an existing server entity. When scaling up is required, the algorithms prefers resources based on locality in that, all other things being equal, a resource that is "nearer" to one already in the server entity is preferred over one that is further away (network-wise). The notion of near or far of course is a relative term and may depend on one or more factors (e.g., latency, loss, cost, number of hops, etc.). In one approach, the system attempts to find the resources nearest to the already-allocated resources. This is not a limitation, however, as other scale-up techniques that make use of other criteria may be used.

The routine begins at step 800 when the user or some other system requests more capacity from the server entity. This request may be received programmatically. At step 802, the system responds by allocating more resources for the unique server ID, based on the particular resource scale-up allocation algorithm that is used. The particular scale-up resource selection method utilized is not a limitation of this disclosure. At step 804, the tracking system is updated to mark that the newly-assigned resources are now being used. The routine then continues at 806, with each newly-assigned resource being tagged with the user server ID as before.

FIG. 9 depicts a process flow for a server scale-down resource allocation method according to a third embodiment. Generally, this process is used to select what resources to de-allocate from the existing server entity. There may be varied approaches to scale-down. For example, resources to be de-allocated may be selected based on their location to free-up resources from the resource pool, to maximize the size of available pools, to maximize the size of the pool itself, or the like. A round robin selection of these factors may be enforced, e.g., to facilitate a balance across the pools. In another variant, the algorithm analyzes whether the allocation is the optimal solution for the given workload, and if not, warns the user that performance of the workload will suffer. In yet another variant, the algorithm predicts capacity needed in the system based on the given workload and makes recommendations appropriately.

The routine begins at step 900 upon receipt of a request from the user or some other system for less capacity. This request may be received programmatically. At step 902, the system responds to the request by executing the algorithm and de-allocating the resource(s) from the server entity. The particular scale-down resource selection method utilized is not a limitation of this disclosure. At step 904, the tracking system is updated that the de-allocated resources have now been returned to their respective resource pools and are not idle, and to update the unique server ID. At step 906, the tag (identifying the server entity) is removed from the resource identifier to complete the process.

Thus, in response to a request for data center resources, e.g., when allocating a new server, a server entity is defined by selecting resources from the one or more resource pools. The resources may be selected based on a projected need or specified demand associated with the request, or some other criteria. The server entity is associated with the unique server ID, which is stored in the database together with the identifiers for the resources that comprise the server entity. The server entity may then be scaled up or down as necessary based on the workload requirements of the request or one or more related or associated requests.

Thus, for example, as the request is processed, or as additional related requests are received for processing, the tracking system monitors usage to determine if an adjustment to the resources comprising the server entity is needed. Usage is monitored by one or more monitoring systems or sub-systems in the data center. A particular monitoring sub-system may be associated with a particular server resource type. Thus, for example, one monitoring sub-system may be used to monitor the memory system while a second monitoring sub-system is used to monitor the CPUs. Monitoring is accomplished by provisioning or configuring a resource to provide information about its state or status, all in a known manner. The monitoring subsystems may be de-centralized and provide data back to a central monitor that collects and analyzes the server entity to determine whether an adjustment may be needed and, if so, the nature and extent of such adjustment.

When, and based on the monitoring, the tracking system determines that an adjustment in the server entity components is necessary, the adjustment is carried out, e.g., by changing the allocation of resources that are associated with the server entity. Thus, for example, when additional compute and memory are needed (scale-up), the tracking system (by itself, or by cooperation with other resource provisioning systems in the data center) adjusts the server entity, e.g., by selecting additional processors and memory, which are then added to the server entity. These additional processors and memory may be selected based on one or more criteria, such as load, proximity to the existing resources that comprise the server entity, availability, power consumption, heat generation and the like, as indicated by the information being maintained and tracked in the database. When, on the other hand, the monitoring indicates that fewer resources are required (scale-down), the tracking system adjusts the server entity, e.g., by de-selecting certain processors and memory, which are then de-allocated from the server entity and returned to their respective resource pools.

The techniques described herein provide significant advantages. They enable initial resources to be appropriately allocated based on projected need, and dynamic scale-up or scale-down of physical or virtual hardware capacity without any downtime, and with minimal or no customer impact. Because a server entity is built-up from allocation of a subset of processors, a subset of memory, etc., only those resources that are needed to handle the workload are used. Further, when scale-up is required, the system obtains the additional resources needed, preferably based on locality considerations (i.e., where the additional resources are) to ensure continued good performance at low cost. Because the approach leverages disaggregated servers, these advantages enable the data center to realize greater modularity, higher resource utilization, lower costs, and better performance. Indeed, with the emergence of larger data centers and the need for clouds with ever-larger numbers of servers, the approach provides a way for a data center to operate in a much more cost-effective and reliable manner. Server entities are built as needed, and the resources that comprise these entities are varied dynamically as needed. The approach solves the workload allocation issues that result from use of traditional servers, which suffer from resource fragmentation when one or more resources therein become underutilized due to mismatched or changing workload requirements. By using shared resource pools and the resource allocation methods described herein, the servers are constructed dynamically and on-demand by allocating from these resource pools according to the workload's requirements.

The advantages described herein are provided for by maintaining and using the various resource server pools, and the resource allocation mechanism that enables generation and management of the server entities. An embodiment of such an approach that further includes the tracking system and its associated database of unique server identifiers and their associated data enables the system to provide more robust inventory management over the server resource pools, and to ensure that the scale-up and scale-down algorithms work more efficiently. A still further embodiment of such an approach that also uses those unique server identifiers as resource tags provide still additional advantages, as it ensures that resources that are not associated with the server entity are not processing server requests that should be handled thereby.

As has been described, the functionality described above may be implemented as a standalone approach, e.g., a software-based function executed by a processor, or it may be available as a service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The techniques described herein may be implemented in or in conjunction with various server-side architectures including simple n-tier architectures, web portals, federated systems, and the like. As already noted, the techniques herein also may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the trusted platform module function is implemented in software, which includes but is not limited to firmware, resident software, microcode, and the like. Furthermore, the download and delete interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a non-transitory computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the interfaces and utility are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein generally provide for the above-described improvements to a technology or technical field, as well as the specific technological improvements to workload management schemes, such as described above.

Having described our invention, what we now claim is as follows.

The invention claimed is:

1. A method for assigning resources in a compute environment, comprising
providing a set of server resource pools, wherein a server resource pool comprises a set of resources of a common type;
responsive to receipt of a request, defining a server entity composed of one or more resources selected from two or more of the server resource pools, the server resource pools being a compute pool, and a memory pool, wherein the one or more resources are selected from the two or more of the server resource pools based on a workload associated with the request;
associating a unique server identifier to the server entity and to the request;
providing the unique server identifier to each of the one or more resources in the server entity, thereby allocating the one or more resources to the server entity;
at a resource of the one or more resources that receives the request, acting on the request upon verifying that the unique server identifier associated to the request matches the unique server identifier of the server entity to which the resource is allocated;
receiving information collected from monitoring the one or more resources as the workload is processed; and
based on the monitoring, adjusting a composition of the server entity based on a change in the workload.

2. The method as described in claim 1 further including:
cross-referencing a resource-specific identifier for each resource with the unique server identifier; and
updating the unique server identifier and a set of resource-specific identifiers cross-referenced thereto to reflect adjustment of the composition of the server entity.

3. The method as described in claim 1 wherein the composition of the server entity is adjusted by adding to the server entity one or more resources of a server resource pool.

4. The method as described in claim 3 wherein the one or more resources added to the server entity are selected based on network locality relative to others of the resources already present in the server entity.

5. The method as described in claim 1 wherein the composition of the server entity is adjusted by removing from the server entity one or more resources of a server resource pool.

6. The method as described in claim 5 further including returning to the resource server pools the one or more resources that are removed from the server entity.

7. Apparatus for assigning resources in a compute environment, comprising:
one or more hardware processors;
computer memory holding computer program instructions executed by the one or more hardware processors and configured to:
manage a set of server resource pools, wherein a server resource pool comprises a set of resources of a common type;

responsive to receipt of a request, define a server entity composed of one or more resources selected from two or more of the server resource pools, the server resource pools being a compute pool, and a memory pool, wherein the one or more resources are selected from the two or more of the server resource pools based on a workload associated with the request;

associate a unique server identifier to the server entity and to the request;

provide the unique server identifier to each of the one or more resources in the server entity, thereby allocating the one or more resources to the server entity;

at a resource of the one or more resources that receives the request, act on the request upon verifying that the unique server identifier associated to the request matches the unique server identifier of the server entity to which the resource is allocated;

receive information collected from monitoring the one or more resources as the workload is processed; and based on the monitoring, adjust a composition of the server entity based on a change in the workload.

8. The apparatus as described in claim 7 wherein the computer program instructions are further configured to:

cross-reference a resource-specific identifier for each resource with the unique server identifier; and update the unique server identifier and a set of resource-specific identifiers cross-referenced thereto to reflect adjustment of the composition of the server entity.

9. The apparatus as described in claim 7 wherein the composition of the server entity is adjusted by adding to the server entity one or more resources of a server resource pool.

10. The apparatus as described in claim 9 wherein the one or more resources added to the server entity are selected based on network locality relative to others of the resources already present in the server entity.

11. The apparatus as described in claim 7 wherein the composition of the server entity is adjusting by removing from the server entity one or more resources of a server resource pool.

12. The apparatus as described in claim 11 wherein the computer program instructions are further configured to return to the resource server pools the one or more resources that are removed from the server entity.

13. A computer program product in a non-transitory computer readable medium for use in a data processing system for assigning resources in a compute environment, the computer program product holding computer program instructions executed in the data processing system and configured to:

manage a set of server resource pools, wherein a server resource pool comprises a set of resources of a common type;

responsive to receipt of a request, define a server entity composed of one or more resources selected from two or more of the server resource pools, the server resource pools being a compute pool, and a memory pool, wherein the one or more resources are selected from the two or more of the server resource pools based on a workload associated with the request;

associate a unique server identifier to the server entity and to the request;

provide the unique server identifier to each of the one or more resources in the server entity, thereby allocating the one or more resources to the server entity;

at a resource of the one or more resources that receives the request, act on the request upon verifying that the unique server identifier associated to the request matches the unique server identifier of the server entity to which the resource is allocated;

receive information collected from monitoring the one or more resources as the workload is processed; and based on the monitoring, adjust a composition of the server entity based on a change in the workload.

14. The computer program product as described in claim 13 wherein the computer program instructions are further configured to:

cross-reference a resource-specific identifier for each resource with the unique server identifier; and update the unique server identifier and a set of resource-specific identifiers cross-referenced thereto to reflect adjustment of the composition of the server entity.

15. The computer program product as described in claim 13 wherein the composition of the server entity is adjusted by adding to the server entity one or more resources of a server resource pool.

16. The computer program product as described in claim 15 wherein the one or more resources added to the server entity are selected based on network locality relative to others of the resources already present in the server entity.

17. The computer program product as described in claim 13 wherein the composition of the server entity is adjusting by removing from the server entity one or more resources of a server resource pool.

18. The computer program product as described in claim 17 wherein the computer program instructions are further configured to return to the resource server pools the one or more resources that are removed from the server entity.

19. A data center facility, comprising:

a set of server resource pools, the server resource pools comprising at least a compute pool, and a memory pool;

at least one disaggregated compute system comprising processors selected from the compute pool, computer memories selected from the memory pool, and an optical interconnect;

a database that stores a unique server identifier defining the at least one disaggregated compute system, the unique server identifier being associated in the database with a resource-specific identifier for each of the processors and computer memories in the at least one disaggregated compute system, wherein the resource-specific identifier providing one of: a status of a resource, an attribute of the resource, and a relationship of the resource to one or more other resources; and a tracking system responsive to workload changes in the at least one disaggregated compute system to selectively adjust a composition of the processors or the computer memories therein according to workload demand;

the at least one disaggregated compute system including a given resource selected from the server resource pools configured to receive and act on a request upon verifying that the unique server identifier associated to that request matches the unique server identifier of the at least one disaggregated compute system to which the given resource is allocated;

the unique server identifier and resource-specific identifiers associated with the unique server identifier being updated in the database to reflect adjustment of the composition of the at least one disaggregated compute system.

20. The data center facility as described in claim 19 wherein the processors and computer memories are selected based on one of: locality, a best fit to an anticipated workload, and future expansion requirements associated with the data center facility.

* * * * *